United States Patent [19]
Stürmer et al.

[11] Patent Number: 5,337,866
[45] Date of Patent: Aug. 16, 1994

[54] DEVICE FOR MONITORING A FRICTION CLUTCH

[75] Inventors: Winfried Stürmer, Euerbach; Hans-Jürgen Drexl, Schonungen-Mainberg, both of Fed. Rep. of Germany

[73] Assignee: Fichtel & Sachs AG, Schweinfurt, Fed. Rep. of Germany

[21] Appl. No.: 815,272

[22] Filed: Dec. 27, 1991

[30] Foreign Application Priority Data

Jan. 4, 1991 [DE] Fed. Rep. of Germany ....... 4100091

[51] Int. Cl.⁵ .............................................. B60K 41/02
[52] U.S. Cl. .................................. 477/175; 192/82 T; 192/103 R
[58] Field of Search ................ 192/0.032, 0.076, 0.096, 192/30 W, 54, 82 T, 103 R

[56] References Cited

U.S. PATENT DOCUMENTS

| | | | |
|---|---|---|---|
| 4,509,625 | 4/1985 | Tellert | 192/0.076 X |
| 4,662,492 | 5/1987 | Troeder | 192/0.032 |
| 4,667,787 | 5/1987 | Hofmann | 192/0.032 |
| 4,854,433 | 8/1989 | Tellert | 192/0.076 X |
| 4,971,183 | 11/1990 | Tellert | 192/0.076 X |
| 4,986,401 | 1/1991 | Petzold et al. | 192/0.032 |

FOREIGN PATENT DOCUMENTS

| | | |
|---|---|---|
| 3601708 | 7/1987 | Fed. Rep. of Germany . |
| 3800607 | 7/1989 | Fed. Rep. of Germany .... 192/82 T |
| 3828128 | 3/1990 | Fed. Rep. of Germany . |
| 2223076 | 3/1990 | United Kingdom ............. 192/0.032 |

Primary Examiner—Richard M. Lorence
Attorney, Agent, or Firm—Anderson Kill Olick & Oshinsky

[57] ABSTRACT

For the protection of an automatized friction clutch of a motor vehicle it is proposed, by means of a computer device (23) to compute periodically data for the instantaneous friction performance of the clutch (5) and to add them up in several also periodically actualized time window stores. The time window stores have different time windows and correspondingly store a range of friction work mean values. Associated with the individual time window stores are respectively several limit values, the magnitude is additionally a function of the air temperature of a clutch casing (37) surrounding the clutch (5). A computer device (23), depending upon the temperature measured by means of a temperature sensor (35) and upon the limit values ruling for this temperature, institutes graded protective measures. For safety reasons, none of the protective measures completely prevents the operativeness of the clutch (5). As the heat loading of the clutch (5) increases only the clutch comfort is increasingly reduced, and as the maximum loading limit is approached, active comfort-impairing measures, such as, e.g., oscillations of a regulating drive (19) of the clutch (5) causing "grab" of the clutch (5), are brought about.

17 Claims, 2 Drawing Sheets

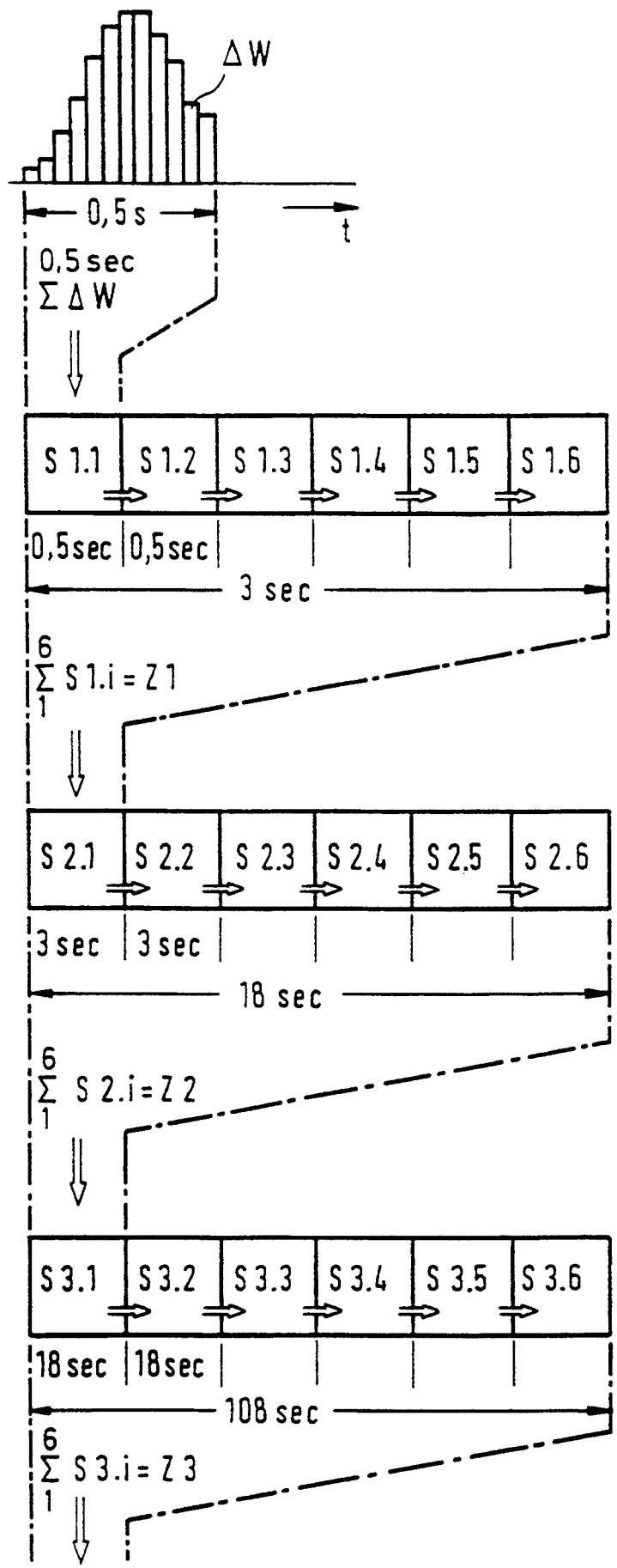

DEVICE FOR MONITORING A FRICTION CLUTCH

BACKGROUND OF THE INVENTION

The invention relates to a device for monitoring a friction clutch, particularly an automatized friction clutch of a motor vehicle.

From DE-A-36 01 708 it is known, for monitoring the friction clutch of a motor vehicle, to measure the torque produced by the engine of the motor vehicle, or possibly to determine it through a stored family of characteristics of the engine and, by means of a computer device, to compute friction performance data by multiplying the torque by the difference rotational speed between input rotational speed and output rotational speed of the clutch. The computer device adds up friction performance values detected in succession and compares this friction work mean value thus formed with a limit value. When the limit value is exceeded a warning signal is switched on which indicates the thermal overload. The known monitoring device, however, operates relatively inaccurately as it is unable to distinguish between momentary peak loading and the clutch continuous loading.

From DE-A-38 28 128 a device is known for monitoring an automatized friction clutch of a motor vehicle, in which again a computer device calculates data dependent upon the instantaneous torque and the instantaneous difference between input rotational speed and output rotational speed of the clutch, which represent the instantaneous frictional performance of the clutch. By means of the summation of the friction performance data over several time intervals of different duration a differentiation is made between a short-term, medium-term and a long-term temperature behaviour of the clutch. Associated with the frictional operation means values detected for the individual time intervals are again limit values on the exceeding of which either warning signals are emitted, or the control characteristic at which a control automatically engages or releases the clutch, is governed. In order to simulate the short-term, medium-term and long-term cooling behaviour of the clutch, correction values are periodically extracted from the friction work means values.

This known device also permits only a relatively inaccurate monitoring. On the one hand, errors are added up when calculating the friction performance data when these are summed up for arriving at the friction work mean values. The clutch continuous loading can therefore be monitored only very inexactly. In addition, with the known device the cooling behaviour of the clutch is considered only very roughly, as the cooling behaviour depends upon a plurality of parameters not taken into consideration, such as, e.g., the outside air temperature, driving speed and the rotational speed of the clutch. Accordingly, a monitoring of the clutch continuous loading is therefore possible only limitedly. The same applies also to the monitoring of the peak loading as the loading bearable is dependent upon the output temperature of the clutch.

An inexact determination of the friction work mean values results in the premature inception of the overload protective measures in a cold clutch resulting in an unnecessary loss of comfort, while, when the clutch has been highly loaded for a lengthy period, peak loadings can ruin the clutch before the overload protection is enabled.

SUMMARY OF THE INVENTION

The invention provides a device for monitoring a friction clutch, particularly an automatized friction clutch, which can monitor with a high degree of accuracy both a momentary peak loading and also the continuous loading of the clutch.

Within the scope of the invention, by means of a computing device, friction performance data succeeding each other with a predetermined time period are computed. The data represent the instantaneous frictional performance or power. The frictional performance data are summed up for the establishment of several frictional work means values, particularly for the momentary peak loading, a medium-term loading and a long-term continuous loading over several time intervals of suitable, but different duration. Associated with each of the frictional work means values are several limit values which are selected from the computing device dependent on the temperature of the clutch, particularly on the air temperature in the clutch housing. The magnitude of the limit values decreases as the temperature increases.

By means of the temperature-dependent selection of the limit values it is possible to consider adequately exactly, both for the short-term peak loading and for the medium-term to long-term continuous loading, the influence of starting temperature on peak loading as well as the influence of the ambient parameters of the cooling behaviour. Appropriately, the limit values are determined empirically.

In a preferred embodiment of the invention the computer device comprises for the determination of the frictional work mean values several periodically actualizable time window stores or memories, the time windows of which define respectively one of the time intervals, and the contents of which the computer device after each actualization compares with the limit values selectable depending on the clutch temperature associated with the individual time window stores. Such an embodiment affords the advantage that the time window stores can be actualized with different clock rates. The time window store detecting the momentary peak loading can, in this manner, be actualized in very short time intervals of e.g. 0.3 to 1.7 seconds without the time window used for the averaging of the frictional work mean value having to be selected equally as small. The time window can be selected to be greater by a small multiple and for example in the order of magnitude of a few seconds. The same applies to the remaining time window stores.

To be able to maintain an actualization rate within the order of magnitude of 0.3 to 1.7 seconds mentioned above, the frictional performance data must be calculated with comparatively higher clock rates of at least 100 Hz.

In individual cases this could lead to a comparatively high level of memory space demand for the time window stores. In a preferred embodiment which needs only an extraordinarily small amount of memory space, it is provided that each window memory covers a predetermined number of store stages (memory stages) the contents of which can be shifted through in succession through the predetermined number of store stages, with a clock rate associated with the time window store, and determining the length of the time window from a first store stage of each time window store to a last store stage of each time window store, and it is further provided that, associated with each time window store, is a summation device which sums up the contents of the store stages of the time window store to form the frictional work mean values and transmit them to the first store stage of the time window store with the respectively next longer time window, wherein the first store stage of the time window store with the shortest time window receives the frictional performance values computed by the computer device in a summed up manner. With such a store organization the clock rates of the successive time window stores can be staggered correspondingly to the length of the respective time windows. This is effected in the simplest manner in that the clock rate of each time window store is equal to the clock rate of the preceding time window store multiplied by the number of store stages of the preceding time window store. For the sake of simplicity all time window stores have respectively an equal number of store stages: in individual cases, however, may have also different numbers of store stages. It generally applies that the monitoring is effected the more precisely as more more store stages are used. At least three store stages per time window store have proved to be adequate. With 6 time window stores, each of which covers e.g. 6 store stages, it will be possible in this way to monitor a spectrum of 6 frictional work mean values, the time window magnitude of which begins at 3 seconds and covers a continuous loading of 6 hours maximum. If the respective first store stages are used for summation at the same time, a total of 31 store locations will be sufficient for the above-mentioned device.

The computation of the momentary friction performance of the clutch assumes the knowledge of the torques transmitted from the clutch. The clutch torque can be measured by force measurement sensors which, however, requires a comparatively high expenditure in building parts. The expenditure can be reduced if the torque detection device comprises a characteristics store or memory which stores the values of the engine torque dependent upon the position of an accelerator pedal and the input rotational speed of the clutch. The data of such a characteristics store constructed for example as a table store can be ascertained by trial and error, and for the acquisition of the position of the accelerator pedal and of the input rotational speed of the clutch the components available can be utilized anyway. The engine torque, however, corresponds only approximately to the clutch torque. In this respect, in the computation of the frictional performance data, slight and normally neglibible errors can arise. In a preferred embodiment it is however provided that the computer device calculates a value representing the time alteration of the input rotational speed of the clutch multiplied by a predetermined value representing the moment of inertia of the engine, and subtracts respectively from the computed frictional performance value. By means of this simple step the engine torque value can be converted into an actual value representing the clutch torque. In an alternative which also supplies values of the clutch torque it may be provided that the torque detection device comprises a characteristics store which stores values of the torque transmitted by the clutch depending on the position of the releasing mechanism of the clutch. This alternative is also achievable with comparatively low expenditure on constructional parts.

Standard monitoring devices for automatized friction clutches of motor vehicles reduce the loading of the clutch in the event of the limit values being exceeded in that the clutch becomes automatically fully engaged or fully released. This step is carried out particularly on the exceeding of limit values of the momentary peak loading, and thus, for example, when the vehicle with slipping clutch is stationary on an upward-sloping street. Both full engagement and full release of the clutch can, however, lead to an endangering of the traffic. If the clutch is closed automatically to prevent a rise of the temperature, this may lead to a road accident. On the other hand, if the clutch opens automatically, this can lead to accidents on rolling back down a hill. On the other hand, if the clutch is held in the released or engaged state until its temperature has fallen to permissible values, the vehicle may become a traffic obstruction during that time.

From another point of view, which is also appropriate for a monitoring device other than the one explained above, it is sought to be achieved that the frictional performance of the clutch is reduced without the clutch being unable to operate during its cooling down phase.

From this point of view also, a computer device is provided which detects the instantaneous friction performance of the clutch, and effects a summation over several time intervals of different lengths to create several frictional work mean values. The computer device again compares the frictional work mean values with respectively several limit values associated with the individual time intervals. Whenever the limit values are exceeded the computer device influences the characteristic of a control governing the engagement or release of the clutch by means of a servomotor.

The limit values associated with the individual time intervals have stepped values. On the exceeding of a first lower limit value the computer device raises the adjustment rate of the servomotor established by the control, or it reduces a slip of predetermined magnitude permitted by the control for the reduction of torsional vibration. On exceeding an upper second limit value the control is made to produce an oscillating regulation movement of the servomotor and/or the issue of a warning signal. Possibly, on the exceeding of a further limit value situated between the first and second limit value, the adjustment rate can be raised to a maximum value, and/or the slip reducing the torsional vibration can be completely inhibited. As opposed to the standard monitoring devices, with the preceding form of the invention, the clutch comfort is at first gradually reduced before the threatening overheating of the clutch is made recognizable by acoustic or visual warning signals and/or by an artificial "grabbing" of the clutch as a consequence of the compelled oscillating regulation movement. In this way, unnecessarily frequent warning signals irritating the driver are avoided, and still an effective overload protection of the clutch is achieved. As in no event the functionality of the clutch is prevented and anyway active steps are taken considerably reducing clutch comfort, traffic-endangering situations are avoided.

A sustained allowing of the clutch to slip, for example in order to hold the motor vehicle with slipping clutch on a hill, leads to a considerable loading of the clutch. To prevent such situations, it is appropriately provided that the computer device, independently of the exceeding of the second limit value, after the expiration of a time interval of predetermined duration beginning with clutch engagement, causes the control of the clutch actuating drive to perform an oscillating regulation movement and/or to emit a warning signal. For example, after 5 seconds have passed, the attention of the driver is in this way drawn to the overloading by an artificial "grabbing" of the clutch in a manner unpleasant for driving comfort.

The oscillating regulation movement of the artificial "grabbing" of the clutch is appropriately effected with the first characterizing frequency of the drive line of the motor vehicle, in order to produce such a particularly powerful vibratory effect.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIGS. 3a to 3d are diagrams explaining the store space allocation on detecting frictional work mean values.

DESCRIPTION OF PREFERRED EMBODIMENTS

Figure 1:
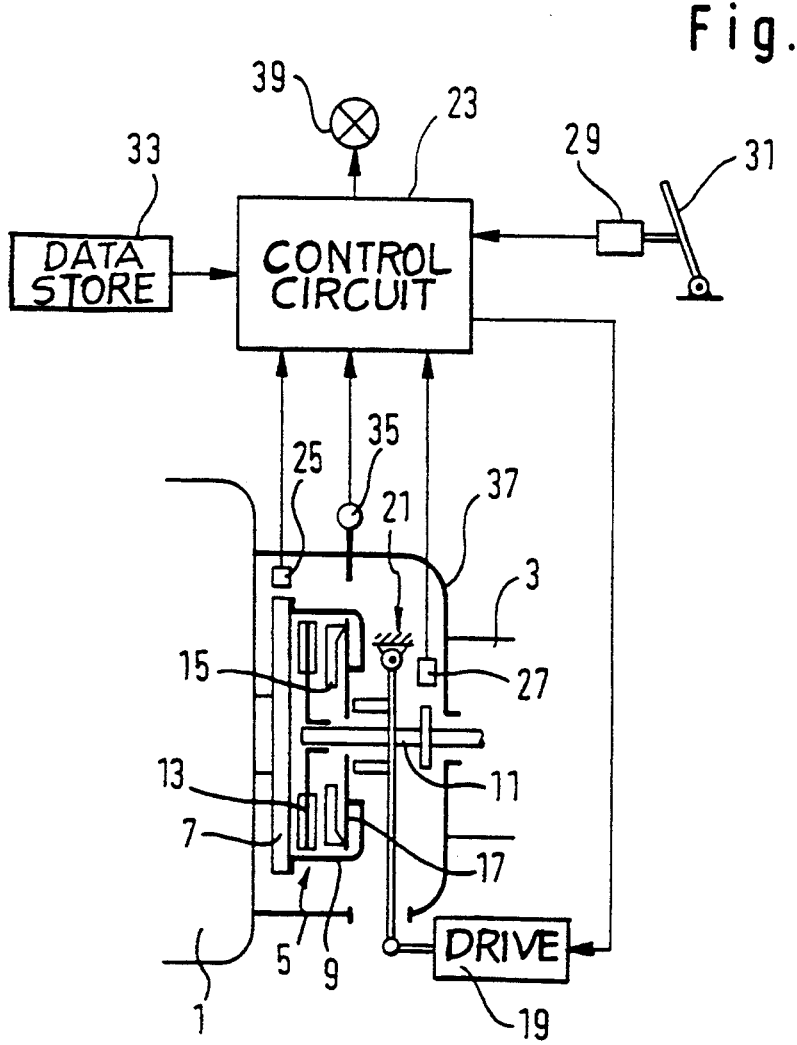
FIG. 1 is a block wiring diagram of a monitoring device for an automatized friction clutch of a motor vehicle.

FIG. 1 shows diagrammatically a friction clutch 5 mounted between an internal combustion engine 1 and a gear box 3 of a motor vehicle. The clutch 5 comprises a clutch cover 9 held on a flywheel 7 of the engine 1 and a clutch disc 13 having friction linings and being non-rotatably guided on an input shaft 11 of the gear box 3. A pressure plate 15 being non-rotatably but axially movably mounted on the housing 9 is pressed by a diaphragm spring 17 onto the flywheel 7 and clamps the clutch disc 13 between it and the flywheel 7. A regulating drive 19 particularly of electric motor type engages or releases the clutch 5 through a release system depending upon the control signals of a control circuit 23 designed as a microprocessor. The control circuit 23 detects by means of a rotational speed sensor 25 the rotational speed of the engine as input rotational speed of the clutch 5, and, by means of a rotational speed sensor 27 the output rotational speed of the clutch 5 occurring at the input shaft of the gearbox 3. Depending upon at least the engine rotational speed and possibly further parameters, particularly a position of an accelerator pedal 31 of the motor vehicle, the control circuit 23 controls the engagement of the clutch 5. In this operation the control circuit 23 differentiates in per se known manner between starting situations and situations when in the course of driving the gears are shifted. In both cases, on engaging the clutch 5, the rate at which the regulating drive 19 drives the clutch 5 is so controlled that engagement is as free from jolts as possible.

The control circuit 23 monitors at the same time the temperature loading of the clutch 5 and automatically provides for a reduction of the temperature loading, inasfar as this is possible without impairing the function of the clutch. For this purpose, the control circuit 23, on the basis of a torque characteristic diagram of the engine 1 stored in a data store 33, detects the engine torque associated with the actual position of the accelerator pedal 31 and the motor rotational speed for the time being and multiplies the engine torque by the difference between the engine rotational speed and gear input rotational speed detected by the rotational speed sensors 25, 27. The frictional performance data continuously periodically detected in this manner are summed up in several time window stores or memories in a manner to be described in greater detail below. The time window stores therefore contain frictional work mean values. The time window stores have time windows of different lengths and thus cover a range which detects the thermal loading of the clutch both for short-term peak loading as well as for medium-term and long-term continuous loadings.

The control circuit 23 monitors the thermal loading of the clutch 5 depending upon limit values with which it compares the contents of the individual time window stores. In this system, associated with each time window store are several limit values the magnitude of which varies depending on the clutch temperature. The control circuit 23 is, for the purpose, connected with a temperature sensor 35 which measures the air temperature in a clutch casing 37 surrounding the clutch 5. The magnitude of the limit values associated with the individual time window stores is staggered, so that on exceeding the individual limit values different protection measures or warning measures can be initiated.

Figure 2:
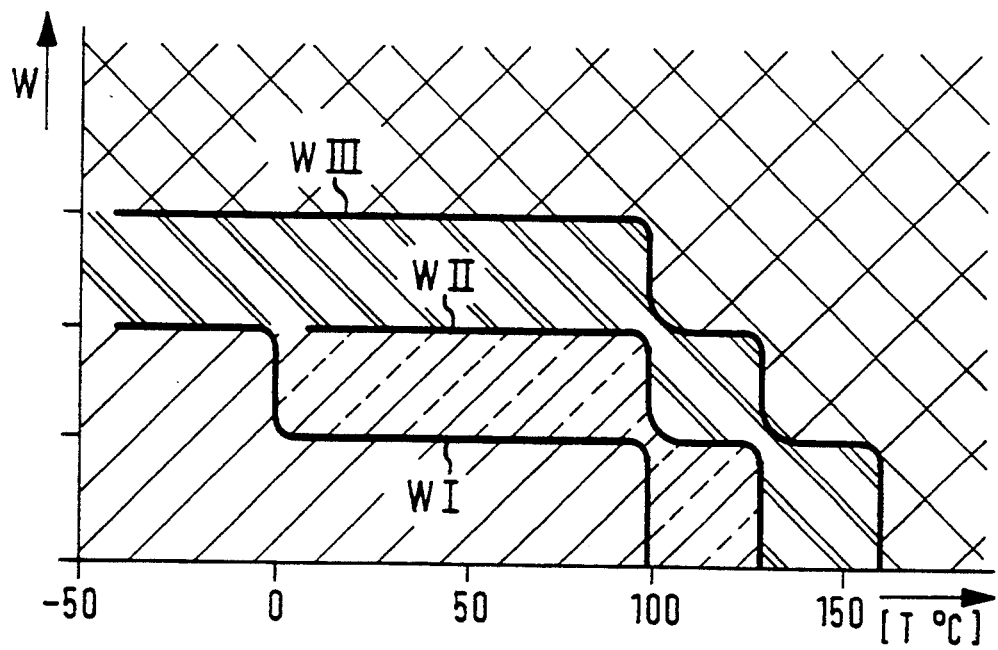
FIG. 2 is a diagram showing the progression of frictional work limit values depending on air temperature in the clutch casing.

FIG. 2 shows the progression in principle of the temperature dependence of the limit values WI, WII and WIII for one of the time widow stores. The limit values of the remaining time window stores differ simply in the absolute values W which rise with the increasing magnitude of the time window utilized for averaging, and they can differ from the example of FIG. 2 by the temperature dependence of the limits.

The securing measures of the control circuit 23 depend upon in which limit value (W)-temperature-(T) range the clutch 5 is situated. In the area, simply hatched, defined by the temperature axis and the limit line WI, no overload protection measures are taken. In the area between the limit lines WI and WII, shown by continuous and dashed hatching lines, the clutch engagement rate normally determined by the control circuit 23 on engaging the clutch is increased by 50%. In addition, the control circuit 23 reduces an additional slip of the clutch, possibly predetermined for the reduction of rotary oscillations, also by some 50%. By taking this step the clutch comfort and the drive comfort are reduced. However, at the same time there is also a reduction of the friction loading of the clutch. If the frictional work mean value present in the time window store is situated in the range between the limit lines WIII and WII characterized in FIG. 2 by double hatching when considering the casing air temperature of the clutch, the change-over slip of the clutch will be restricted to a minimum, i.e. the adjustment rate of the clutch engagement is raised to a maximum and a slip regulation possibly provided for the damping of the rotary oscillations is switched off. If the frictional work mean value exceeds the limit line WIII and is situated in the cross-hatched region of FIG. 2, the clutch regulation drive, additionally to the above-described limitation of the change-over slip and additionally to the switching off of a possible slip regulation, will be moved into a forced oscillation which manifests itself to the driver as "grab" of the clutch. Additionally, the control circuit 23 signals via a warning signal 39 (FIG. 1) the threatening overloading of the clutch.

The organization of the time window stores will now be described with reference to FIGS. 3a to 3d. FIG. 3a shows frictional work values represented as areas W, provided as frictional performance data in succession in the computer clock from the control circuit, multiplied by the computer clock period. Each of the time window stores, of which only three are shown in FIGS. 3b, 3c and 3d, covers 6 store stages S1.1 to S1.6, S2.1 to S2.6, S3.1 to S3.6, etc. Store stages S1.1 to S1.6 constitute the time window store with the smallest time window. The frictional work values computed in the computer clock are summed up in the first stage S1.1. Every 0.5 second the contents of the store stages S1.1 to S1.6, as indicated by arrows, are shifted by one store stage. The store stage S1.6 is thereby overwritten, while the store stage S1.1 is erased and a fresh start is made with the summation of frictional performance data. Every 0.5 second, in addition, the frictional work mean value Z1 is formed over a time window of 3 seconds, while the contents of store stages S1.1 to S1.6 are summated. The frictional work mean value Z1 is compared with the limit values WI, WII and WIII predetermined for this time window store, and on the basis of the casing air temperature an ascertainment is made as to whether protective measures have to be instituted.

On the basis of the actualization taking place every 0.5 second, the frictional work mean value Z1 is based every 3 seconds on new data. The successive frictional work mean values Z1 obtained in succession in the 0.5 second cycle are added up similarly to the first time window store in the first store stage S2.1 of the second time window store, and are shifted from one store stage to the next into an actualization cycle multiplied by the number of the store stages, here with a period of 3 seconds. The last store stage S2.6 is again overwritten, while the first store stage S2.1 is respectively deleted after the summation of 6 values Z1. The contents of the 6 store stages S2.1 to S2.6 are respectively added up. The frictional work mean value Z2 arising from this is therefore averaged over a time window of 18 seconds. With each actualization of the frictional work mean value, i.e. after 3 seconds in each instance, the frictional work mean value is compared with the relevant limit values of the second time window store, and depending upon the casing air temperature protective measures are instituted. The organization of the store stages S3.1 to S3.6 of the third time window store is similar to that of the foregoing stores, though now the actualization period is 18 seconds and the time window 108 seconds. The actualization periods of further time window stores amount correspondingly to 108 seconds, 648 seconds and 3888 seconds. With 6 time window stores it is thus possible to produce a time window of 6 hours.

Additionally to the protection measures set in train through the limit value monitoring, the control circuit 23 reacts to the slip duration of the clutch. If on a rise it is attempted to prevent the vehicle from rolling back by pressing the accelerator pedal 31 causing the clutch to slip, the control circuit 23, after a predetermined time interval, e.g. 5 seconds after the inception of the slipping process, will set off the already mentioned oscillation movement of the regulating drive 19 of the clutch. The clutch "grab" and the loss of comfort associated with it will, as a rule, incite the driver to alter his behaviour. Additionally, the control circuit 23 can switch on the warning signal 39.

For the determination of the frictional performance data the starting point in the example of embodiment described hereinabove has been a torque characteristic diagram of the engine. As, however, for the computation of the frictional performance the torque transmitted by the clutch is relevant, in an improved embodiment there is derived from each torque value read on the engine characteristic diagram a correction value which the control circuit 23 computes by the multiplication of the value of the time-dependent change of the engine rotational speed by a value representing the moment of inertia of the engine. Alternatively, use may be made also of a stored clutch torque characteristic diagram in which the clutch torque is stored, for example, depending upon the position of the disengagement system 21. The position of the disengagement system 21 is known to the control signal 23 through signals from a position sensor of the actuator 19 not shown in detail.

While specific embodiments of the invention have been shown and described in detail to illustrate the application of the inventive principles, it will be understood that the invention may be embodied otherwise without departing from such principles.

What we claim is:

1. A device for the monitoring of a friction clutch, particularly an automatized friction clutch of a motor vehicle, comprising
   a) torque detection means for detecting data which represent at least approximatively the instantaneous torque developing at the clutch (5);
   b) rotational speed sensors (25, 27) which supply data corresponding to the instantaneous input rotational speed of the clutch (5) and to the instantaneous output rotational speed of the clutch (5);
   c) a temperature sensor (35) which detects the temperature of a component (37) of the clutch (5);
   d) computer means (23) which, depending on the data of said torque detection means and of said rotational speed sensors (25, 27), compute successively with a predetermined time period data which represent at least approximately the instantaneous frictional performance of the clutch (5), and which adds up the frictional performance data for the determination of several frictional work mean values over several time intervals of different durations, wherein said computer means (23) compares the frictional work mean values each being determined in an individual one of said time intervals with the predetermined limit values associated with said time intervals and, in the event of the individual limit values being exceeded, produces exceed-indicating signals, wherein a plurality of limit values is associated with each of said frictional work mean values, the magnitude of said limit values being a function of the clutch temperature, and wherein said computer means (23) produces said exceed-indicating signals depending on the clutch temperature detected and on the limit values predetermined for the detected clutch temperature.

2. A device according to claim 1, wherein said computer means (23) comprises, for the determination of the frictional work mean values, several periodically actualizable time window stores (Z) the time windows of which each define one of said time intervals, and the contents of which said computer means (23) compares after each actualization with the limit values selectable depending on the clutch temperature and associated with the individual time window stores (Z).

3. A device according to claim 2, wherein each time window store (Z) comprises a predetermined number of store stages (S), the contents of a time window store, at a clock rate which is specific to the time window store (Z), starting from a first store stage of the time window store (Z), are shifted to a last store stage of the time window store (Z) in succession through the predetermined number of store stages (S), and wherein, associated with the time window store (Z), is summation means which adds up the contents of the store stages (S) of the time window store (Z) to form the frictional work mean value, and store same in the cycle of the clock rate in the first store stage of a time window store (Z) having a respectively next-in-length time window, the first store stage of the time window store (Z), having the shortest time window taking up the summated frictional work values computed by said computer means (23).

4. A device according to claim 3, wherein the clock rate of each time window store (Z) is equal to the clock rate of the preceding time window store (Z) multiplied by the number of store stages (S) of the preceding time window store (Z).

5. A device according to claim 4, wherein the time window stores (Z) comprise respectively a same number of store stages (S).

6. A device according to claim 3, wherein each time window store (Z) has at least three store stages (S).

7. A device according to claim 3, wherein the clock period of the time window store (Z) having the smallest time window is between 0.3 sec and 1.7 sec.

8. A device according to claim 3, wherein
the limit values associated with the individual frictional work mean values decrease particularly in steps as temperature rises.

9. A device according to claim 1, wherein
the temperature sensor (35) measures the air temperature in a clutch casing (37) surrounding the clutch (5).

10. A device according to claim 1, wherein
said computer means (23) calculate a value representing the change per time unit of the input rotational speed of the coupling (5) multiplied by a predetermined value representing the moment of inertia of the engine (1) and deducts it from the computed friction performance value.

11. A device according to claim 1, wherein
said torque determination means comprises a characteristics store (33) which memorizes values of the engine torque dependent on the position of a performance-determining component of the engine, particularly an accelerator pedal (31), and on the input rotational speed of the clutch (5).

12. A device according to claim 1, wherein
said torque determination means comprises a characteristics store (33) which memorizes values of the torque transmitted by the clutch (5) depending on the position of the clutch (5) release device.

13. A device according to claim 6, wherein each time store has five to seven store stages (S).

14. A device for the monitoring of an automatized friction clutch (5) of a motor vehicle which can be engaged or released by means of a servomotor (19) and of a control (23) governing the servomotor (19) dependent upon the engine rotational speed detected by means of a rotational speed sensor (25), comprising computer means detecting the instantaneous friction performance of the clutch (5) and summating over several time intervals of different duration for the formation of several frictional work mean values, which computer means compare the frictional work mean values with several limit values individually associated with the time intervals, and, when the limit values are exceeded, produces exceed-indicating signals influencing the clutch engagement and/or clutch release characteristic of the control (23), wherein the limit values associated with the time intervals have stepped values, wherein said computer means, on exceeding at least one first limit value, produce at least one first exceed-indicating signal which increases the clutch actuation rate of the servomotor (29) established by the control (23) and/or reduce a clutch slip of predetermined magnitude allowed by the control (23) for the reduction of rotary oscillation, and on exceeding a second limit value higher than said first limit value produce a second exceed-indicating signal which, additionally to the measures provided by each first exceed-indicating signal cause the control (23) to effect an oscillating regulating movement of the regulating drive (19) and/or to issue a warning signal (39).

15. An arrangement according to claim 14, wherein said computer means monitor the exceeding of several limit values and, on the maximum one of said limit values being exceeded, increases the regulation rate to a value maximally permissible for the operation of the motor vehicle and/or completely prevents slip reducing rotary oscillations.

16. An arrangement according to claim 14, wherein said computer means, independently of the exceeding of a limit value, after the expiry of a time interval of predetermined duration beginning with a clutch engagement process, causes the control (23) to perform the oscillating regulation movement of the servomotor (19) and/or to emit the warning signal (39).

17. An arrangement according to claim 14, wherein the oscillating regulation movement is produced with the first natural frequency of the drive line of the motor vehicle.

* * * * *